US008985580B2

(12) United States Patent      (10) Patent No.: US 8,985,580 B2
Ozaki      (45) Date of Patent: Mar. 24, 2015

(54) INFORMATION PROCESSING APPARATUS AND METHOD FOR DESIGNATING PLURAL DISCHARGE TRAYS TO STACK COPIES WITH NOTIFICATION FUNCTION

(75) Inventor: Hiroshi Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 12/788,213

(22) Filed: May 26, 2010

(65) Prior Publication Data

US 2010/0302567 A1    Dec. 2, 2010

(30) Foreign Application Priority Data

May 28, 2009   (JP) ................. 2009-129200

(51) Int. Cl.
*G06F 3/12* (2006.01)
*H04N 1/04* (2006.01)
*G03G 15/00* (2006.01)

(52) U.S. Cl.
CPC .......... *G06F 3/1205* (2013.01); *G03G 15/6547* (2013.01); *G06F 3/1253* (2013.01); *G06F 3/1264* (2013.01); *G06F 3/1282* (2013.01); *G03G 15/5083* (2013.01); *G03G 15/5087* (2013.01); *G06F 3/1255* (2013.01); *G06F 2206/1514* (2013.01); *G03G 15/502* (2013.01); *G03G 2215/00109* (2013.01)
USPC ............................ 271/279; 358/1.15; 358/498

(58) Field of Classification Search
None
See application file for complete search history.

(56) References Cited

U.S. PATENT DOCUMENTS

| | | | |
|---|---|---|---|
| 6,041,214 A * | 3/2000 | Fujikura et al. | 399/403 |
| 2006/0033955 A1* | 2/2006 | Munakata et al. | 358/1.15 |
| 2006/0092464 A1* | 5/2006 | Ataka | 358/1.15 |
| 2006/0261543 A1* | 11/2006 | Miyake et al. | 271/292 |
| 2007/0019224 A1 | 1/2007 | Okada et al. | |
| 2007/0247654 A1* | 10/2007 | Tian | 358/1.14 |
| 2008/0225330 A1* | 9/2008 | Matsuura et al. | 358/1.15 |
| 2009/0278308 A1* | 11/2009 | Toriyabe et al. | 271/298 |

FOREIGN PATENT DOCUMENTS

| | | |
|---|---|---|
| JP | 7-285729 | 10/1995 |
| JP | 2000-335048 A | 12/2000 |
| JP | 2001-138605 A | 5/2001 |
| JP | 2004-268354 A | 9/2004 |
| JP | 2006-323584 A | 11/2006 |
| JP | 2007-050691 A | 3/2007 |
| JP | 2007-190834 A | 8/2007 |

* cited by examiner

*Primary Examiner* — Eric A Rust
*Assistant Examiner* — Haris Sabah
(74) *Attorney, Agent, or Firm* — Canon USA Inc IP Division

(57) ABSTRACT

An information processing apparatus includes a designation unit configured to designate number-of-copies information indicating a number of copies of print media to be stacked in a lump as a unit via a user interface of a printer driver, and a transmission unit configured to set an attribute of a print job based on the number-of-copies information designated by the designation unit and to transmit the set attribute to an image forming apparatus.

10 Claims, 16 Drawing Sheets

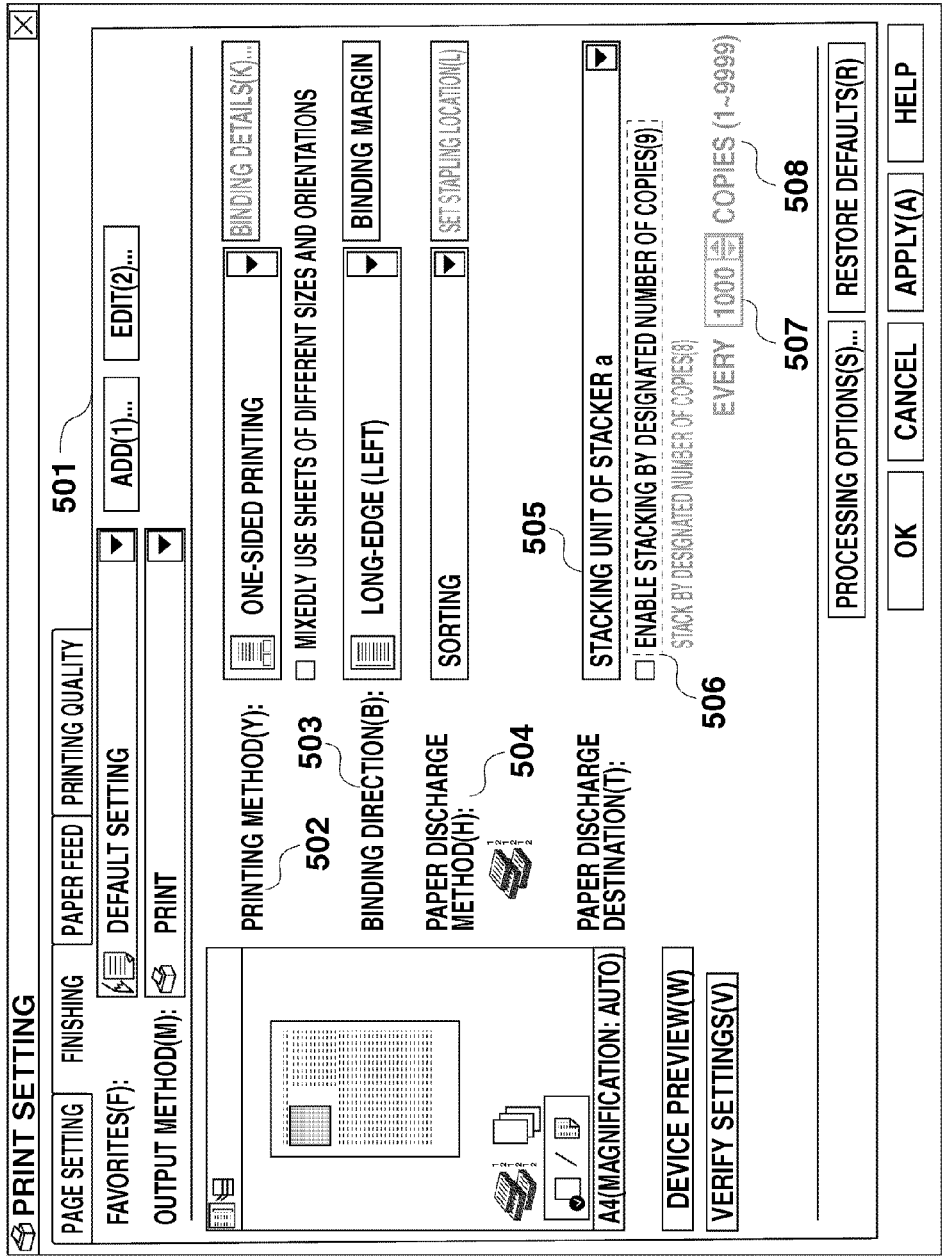

FIG.6A

PRINT SETTING

| GENERAL | COMMON | PORT | DETAILED SETTINGS | SECURITY | DEVICE SETTINGS | FAVORITES |

DEVICE INFORMATION ACQUISITION: AUTO

601

PAPER DISCHARGE OPTIONS

FINISHER(H): NO

STACKER(K): TWO LARGE-CAPACITY STACKERS

PAPER FEED OPTION(S):
POD DECK

INTERNAL SPOOLING PROCESSING(P):
AUTO

☐ USE DIVISION-BY-DIVISION ID MANAGEMENT FUNCTION(J)
☐ SET USER NAME(L)

SET(...)
SET(W)...

602

DEVICE FUNCTION(U)... | SET FONTS(F)... | PAPER FEED METHOD AND PAPER ASSIGNMENT(T)...

ACQUIRE RESOURCE INFORMATION(N) | ACQUIRE DEVICE INFORMATION(G) | VERSION INFORMATION(B)

OK | CANCEL | APPLY(A) | HELP

FIG.6B

EXAMPLE OF CONFIGURATION INFORMATION ACQUIRED WHEN
CONFIGURATION INFORMATION ACQUISITION BUTTON IS PRESSED

| | | |
|---|---|---|
| Model Name: | PODPrinter | 620 |
| Finisher: | None | 621 |
| Stacker: | X1 5000 | 622 |
| | X1 5000 | 623 |
| Paper Deck: | PODDECK 10000 | 624 |

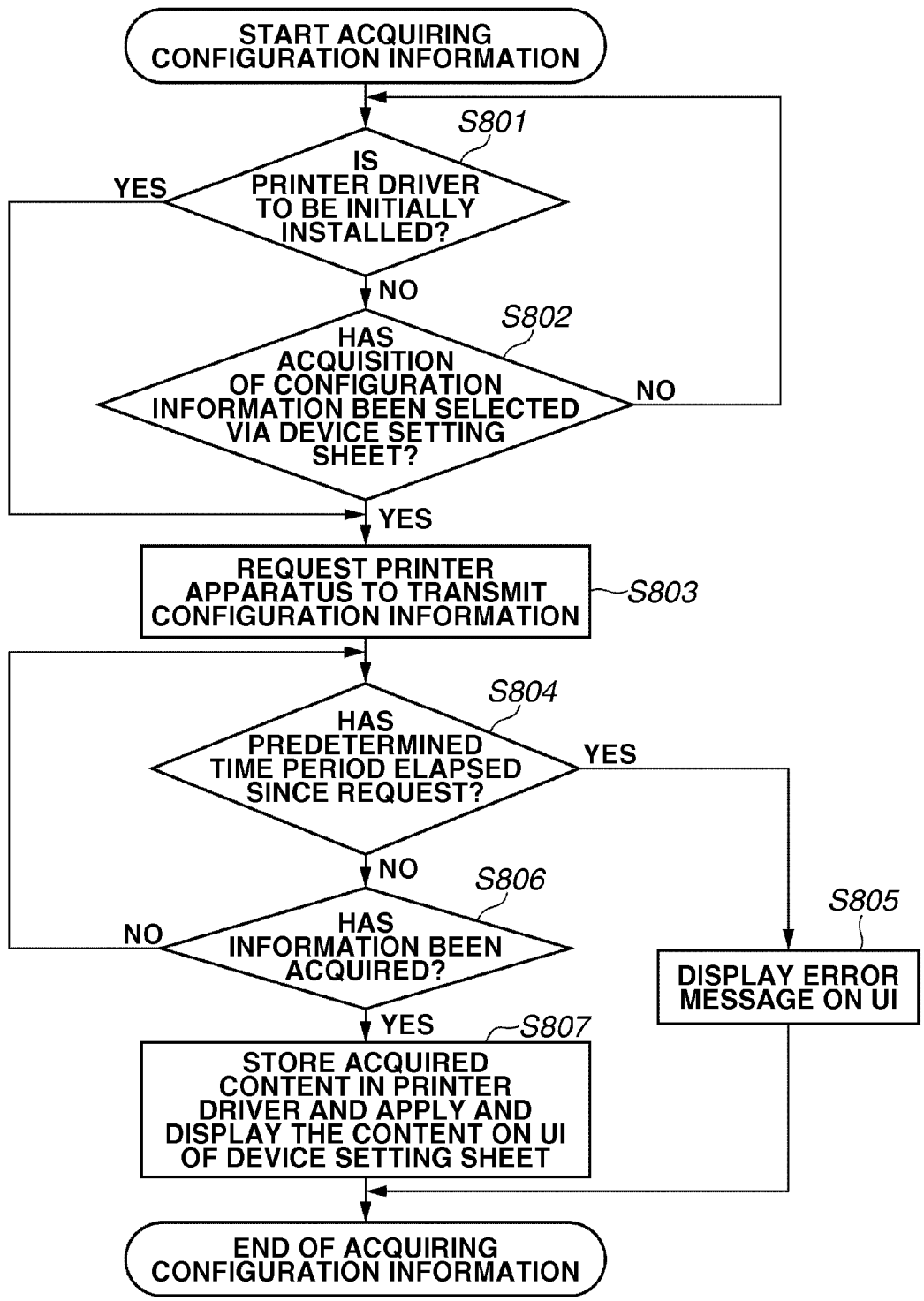

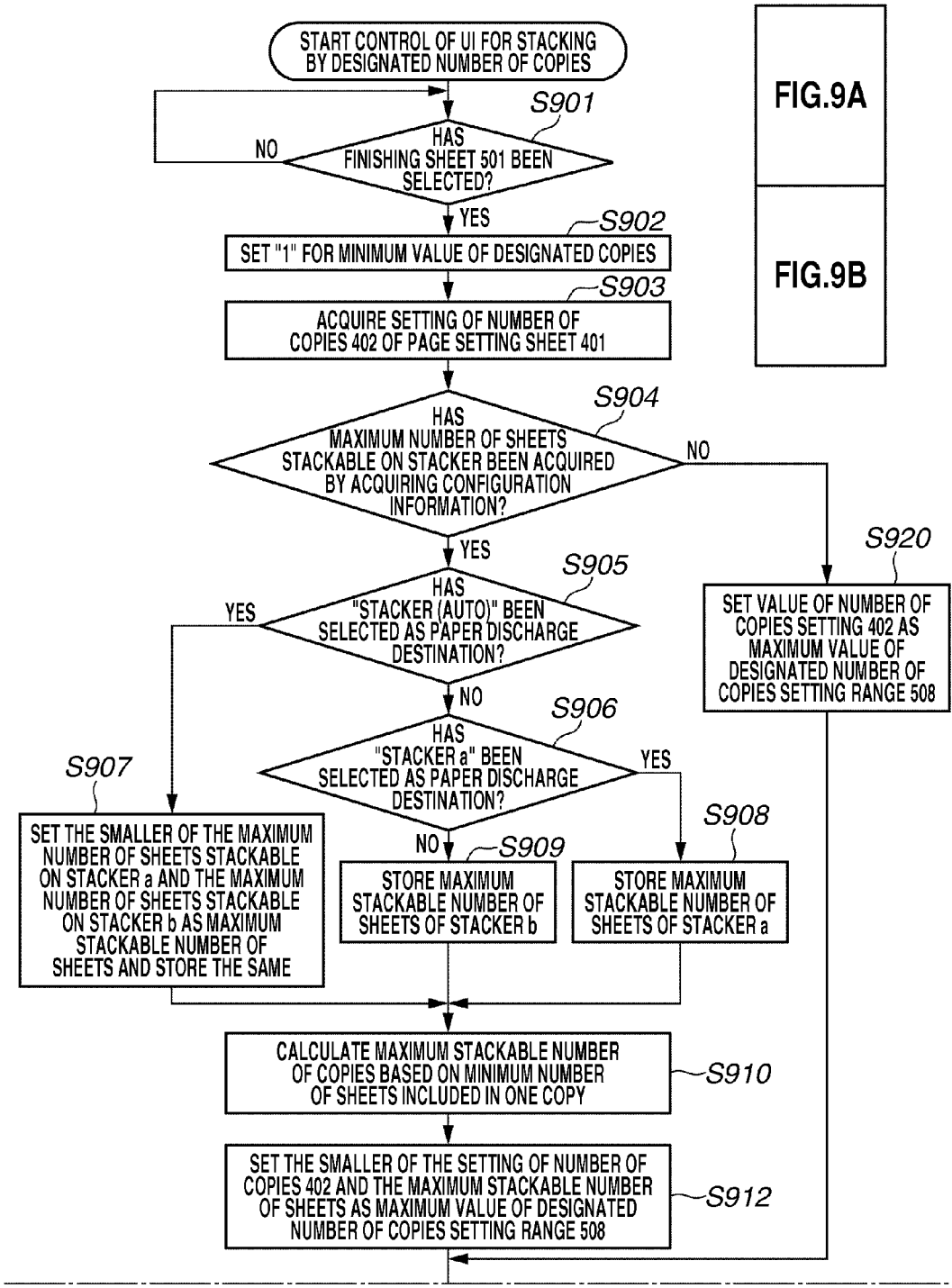

FIG.12

JobStart2(JOB CLASS START) ~1211

· DOCUMENT NAME ~1201
  · BILLING CODE ~1202

BinderStart(BINDER CLASS START) ~1210

· number_of_copies id_att_copies(1000 COPIES) ~1203
  · paper_discharge_destination id_att_output_bin ~1204
  · stacking_by_designated_number_of_copies id_att_output_bin_change ~1205
    Type: id_val_output_bin_change_type_number_of_copies ~1206
    Value: 500 ~1207

DocumentStart(DOCUMENT CLASS START) ~1208

· PAPER SIZE
  · PAPER TYPE
  · PRINTING ORIENTATION
  · RESOLUTION
                 } 1212

------PDL DATA Start------
      ⋮        } 1209
------PDL DATA End------

DocumentEnd(DOCUMENT CLASS END) ~1208

BinderEnd(BINDER CLASS END) ~1210

JobEnd(JOB CLASS END) ~1211

INFORMATION PROCESSING APPARATUS AND METHOD FOR DESIGNATING PLURAL DISCHARGE TRAYS TO STACK COPIES WITH NOTIFICATION FUNCTION

BACKGROUND OF THE INVENTION

1. Field of the Invention

The present invention relates to a printing system configured to perform printing of print data by using an image forming apparatus.

2. Description of the Related Art

A conventional post-processing apparatus for a printer apparatus has a stacker function that enables an output in a large capacity in the unit of a copy. A stacker apparatus like this includes a plurality of stacking stages.

Furthermore, when an operation for outputting a printed sheet on one stacking stage is currently executed, a stacker apparatus like this enables removal of an output sheet from the other stacking stage without suspending the currently executed printing operation. If the number of sheets to be stacked exceeds a maximum number of stackable sheets, the above-described conventional apparatus automatically continues the output operation by using another stacker, which has a stacking function, in the unit of a predetermined number of copies.

In the above-described post-processing apparatus, if a stacker, which is a target of the automatic switching and used in continuing processing of a job whose number of sheets to be stacked exceeds the maximum number of stackable sheets, is not provided, a message that prompts a user to remove sheets currently stacked on the stacker therefrom is notified to the user. In this case, if it is detected that the discharged sheets have been removed, the above-described post-processing apparatus continues the printing operation.

In executing the above-described operation, in order to produce an output product in the number of copies calculated by dividing the total number of printed copies by a designated number of copies, it is necessary for the user to give an instruction for printing for every designated number of copies.

Japanese Patent Application Laid-Open No. 07-285729 discusses a method for controlling a printer driver that sets the number of copies to be output on each of a plurality of paper discharge destinations. More specifically, the control method discussed in Japanese Patent Application Laid-Open No. 07-285729 uses a post-processing apparatus including a plurality of paper discharge bins and sets the number of copies to be output to each paper discharge bin. This conventional method is also useful if the number of copies to be distributed differs for different distribution destinations.

However, the conventional method discussed in Japanese Patent Application Laid-Open No. 07-285729 may not be useful in a printing system in which the total number of copies is divided by the number equivalent to a designated number of copies to produce a large number of print products and the bundles are processed in a lump at the same time by the number of copies calculated by the above-described method. This is because in this case, it is necessary to always generate bundles of the same number of copies.

In order to divide print data generated by an information processing apparatus and output the resulting print products by a designated number of copies, whose number can be calculated by dividing the total number of printed copies by the designated number of copies, according to the purpose of use of the print product, it is necessary that the user is enabled to execute print settings by using a printer driver for executing print settings, which is installed on the information processing apparatus. However, a conventional printer driver like this does not have a function for outputting a print product by every designated number of copies to output the print product in the desired total number of copies.

SUMMARY OF THE INVENTION

According to an aspect of the present invention, an information processing apparatus includes a designation unit configured to designate number-of-copies information indicating a number of copies of print media to be stacked in a lump as a unit via a user interface of a printer driver, and a transmission unit configured to set an attribute of a print job based on the number-of-copies information designated by the designation unit and to transmit the set attribute to an image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 5A and 5B illustrate an example of a finishing setting sheet included in a printer driver.

FIGS. 6A and 6B illustrate an example of a device setting sheet included in a printer driver.

FIG. 8 is a flow chart illustrating an example of control processing for acquiring configuration information about a printer apparatus.

FIG. 12 illustrates an example of a structure of a job according to an exemplary embodiment of the present invention.

DESCRIPTION OF THE EMBODIMENTS

Various exemplary embodiments, features, and aspects of the invention will be described in detail below with reference to the drawings.

Figure 1:
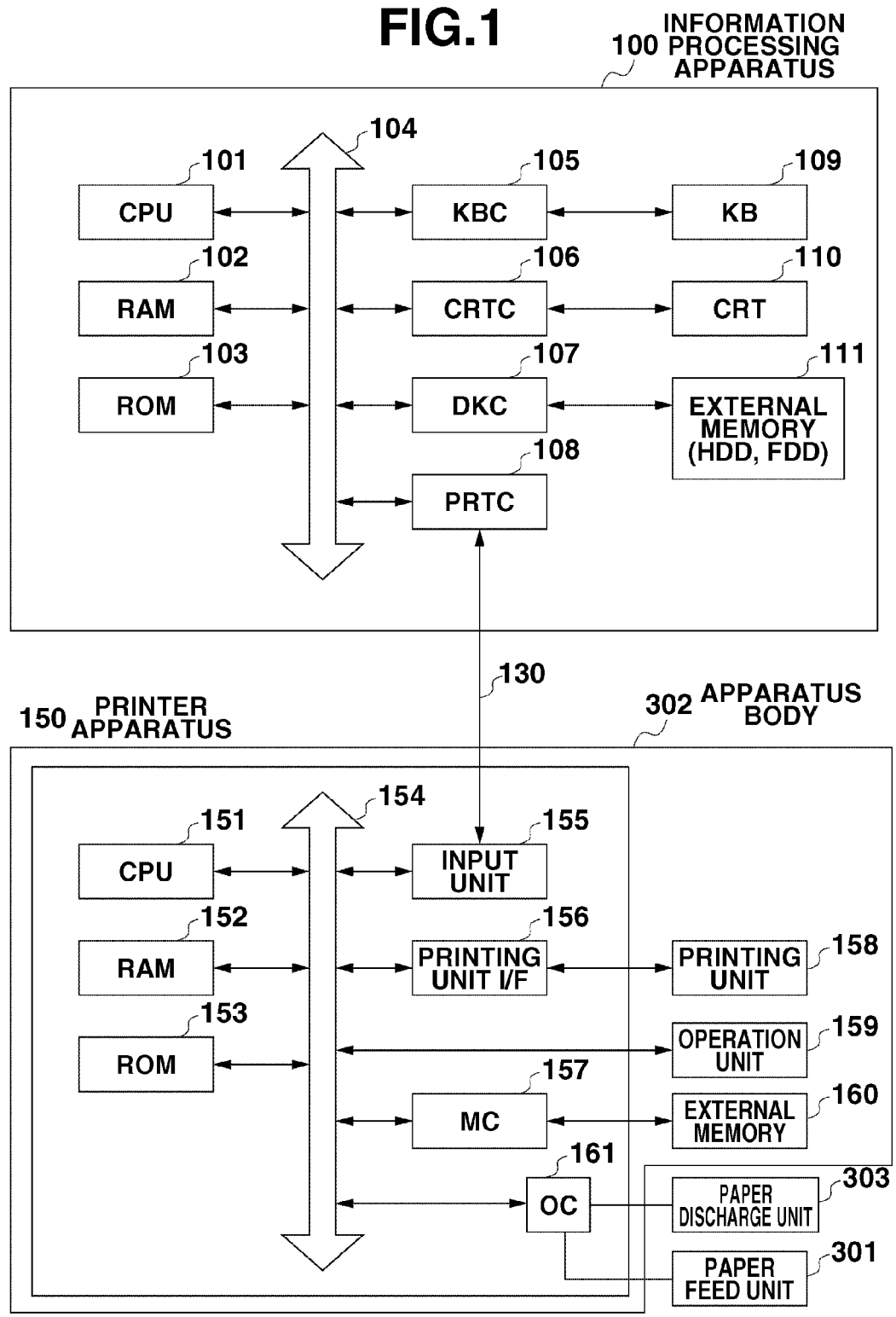
FIG. 1 illustrates an exemplary configuration of a printing system according to an exemplary embodiment of the present invention.

FIG. 1 illustrates an exemplary configuration of a printing system according to an exemplary embodiment of the present invention. Referring to FIG. 1, the printing system includes an information processing apparatus 100 and a printer apparatus 150.

The information processing apparatus 100 and the printer apparatus 150 are in communication with each other via a bidirectional interface 130. A conventional communication method, such as universal serial bus (USB) or Transmission Control Protocol/Internet Protocol (TCP/IP) can be used as the bidirectional interface 130.

The information processing apparatus 100 includes a central processing unit (CPU) 101. The CPU 101 executes processing on a document which mixedly includes graphics, an image, a character, and a table (including a spreadsheet) according to a data processing program stored on an external memory 111. The CPU 101 controls all devices, units, and components connected to a system bus 104.

The external memory 111 stores a program of an operating system (OS), which is a control program executed by the CPU 101, a boot program, various applications, font data, a user file, a file to be edited, and a printer control command generation program (hereinafter simply referred to as a "printer driver").

A random access memory (RAM) 102 functions as a main memory and a work area for the CPU 101. A keyboard controller (KBC) 105 controls a key input, which is input via a keyboard 109 and a pointing device (not illustrated). A cathode ray tube (CRT) controller (CRTC) 106 controls a display by the CRT display (CRT) 110.

A disk controller (DKC) 107 controls an access to the external memory 111, such as a hard disk drive (HDD) or a flexible disk (FDD). A printer controller (PRTC) 108 is connected to the printer apparatus 150 via the bidirectional interface 130. The PRTC 108 executes processing for controlling communication between the information processing apparatus 100 and the printer apparatus 150.

The CPU 101 executes processing for rasterizing an outline font on a display information RAM, which is provided on the RAM 102. Accordingly, the CPU 101 implements what you see is what you get (WYSIWYG) on the CRT 110. In addition, the CPU 101 opens (calls) various windows, which have been registered according to commands input by using a mouse cursor (not illustrated) on a screen displayed on the CRT 110 to execute various data processing.

In executing printing, a user calls a window for executing a print setting. The user can execute a setting of a parameter value of a parameter used in print processing for the printer driver, including a setting of a printer and selection of a printing mode. The CRT 110 is an example of a display unit according to the present exemplary embodiment.

The printer apparatus 150 is controlled by a CPU 151. The CPU 151 outputs an image signal, which is output information, to a printing unit (printer engine) 158 according to a control program stored on a ROM 153 or a control program stored on an external memory 160. The printing unit 158 is connected to a system bus 154.

In addition, the ROM 153 stores a control program executed by the CPU 151. A font ROM of the ROM 153 stores font data, which is used in generating the above-described output information. Furthermore, a data ROM of the ROM 153, if the printer does not include an external memory 160, such as an HDD, stores information utilized by the information processing apparatus 100. The CPU 151 can communicate with the information processing apparatus 100 via an input unit 155. Furthermore, the CPU 151 can notify information about the printer apparatus 150 to the information processing apparatus 100.

A RAM 152 functions as a main memory or a work area for the CPU 151. The memory capacity of the RAM 152 can be expanded by using an optional RAM, which can be connected to the printer apparatus 150 via an expansion port (not illustrated). More specifically, the RAM 152 is used as an output information rasterization area, an environmental data storage area, and a non-volatile random access memory (NVRAM).

An external memory 160 includes an HDD or an integrated circuit (IC) card. A memory controller (MC) 157 controls an access to the external memory 160. The external memory 160 stores font data, an emulation program, and form data as well as the above-described control program.

An operation panel 159 includes an operation switch and an light-emitting diode (LED) display. The number of the external memories 160 is not limited to one. More specifically, it is also useful if a plurality of the external memories 160 is provided so that a plurality of optional cards and a plurality of external memories storing not only the internal fonts but also programs for interpreting printer control languages, whose linguistic systems differ, can be connected.

In addition, it is also useful if an NVRAM (not illustrated) is provided to store printer mode setting information input via the operation panel 159.

Figure 2:
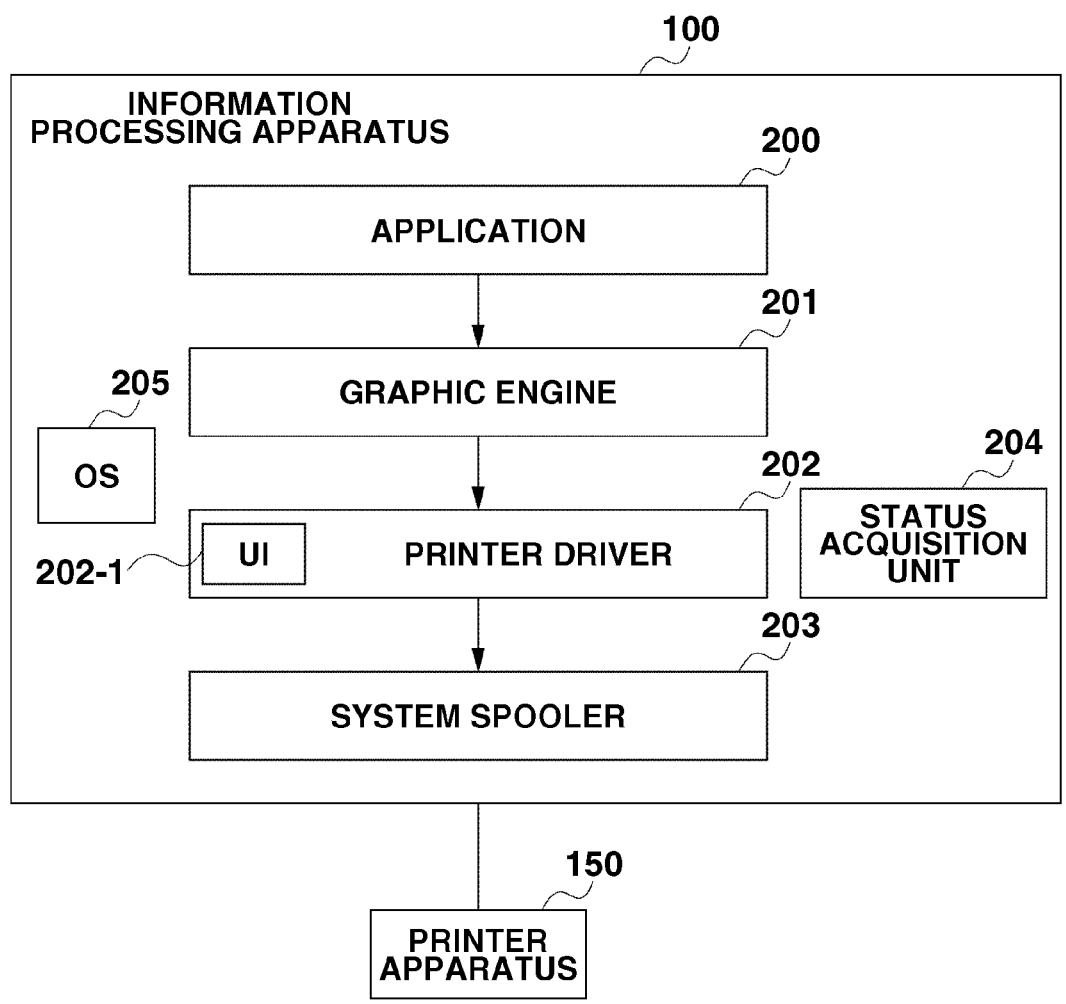
FIG. 2 illustrates an example of software that implements print processing executed by the printing system.

FIG. 2 illustrates an example of software that implements print processing executed by the printing system according to the present exemplary embodiment. Referring to FIG. 2, an image generation application 200 includes a function for generating an original of a document to be printed. More specifically, in executing printing by using the printer apparatus 150, the image generation application 200 utilizes a graphic engine 201 to output image data to a printer driver 202.

The graphic engine 201, which is equivalent to a drawing unit of an OS (graphic device interface (GDI)) in a Windows® OS of Microsoft Corporation, includes a function for transmitting image data output by the image generation application 200 to the printer driver 202.

The printer driver 202 generates print data, such as page description language (PDL) data, which includes a control command that can be recognized and executed on the printer, based on image data (a graphic command) received from the graphic engine 201. In addition, the printer driver 202 includes a function for outputting the generated data to a system spooler 203. The printer apparatus 150 is a printing apparatus. The system spooler 203 includes a function for outputting the print data generated by the printer driver 202 to the printer apparatus 150 by using a bidirectional interface.

The above-described software is stored on the external memory 111 of the information processing apparatus 100. The CPU 101 loads and executes the software on the RAM 102 during booting of the software.

The status acquisition unit 204 acquires status information (functional information) about a stacker, which is an example of a post-processing apparatus. The acquired information is displayed on the printer driver 202.

An option controller (OC) 161 can communicate with and controls a paper discharge unit 303, which discharges a printed sheet, and a paper feed unit 301. It is also useful if the paper discharge unit 303 and the paper feed unit 301 are directly connected to the system bus 104. In this case, the paper discharge unit 303 is controlled by the CPU 101.

Figure 3:
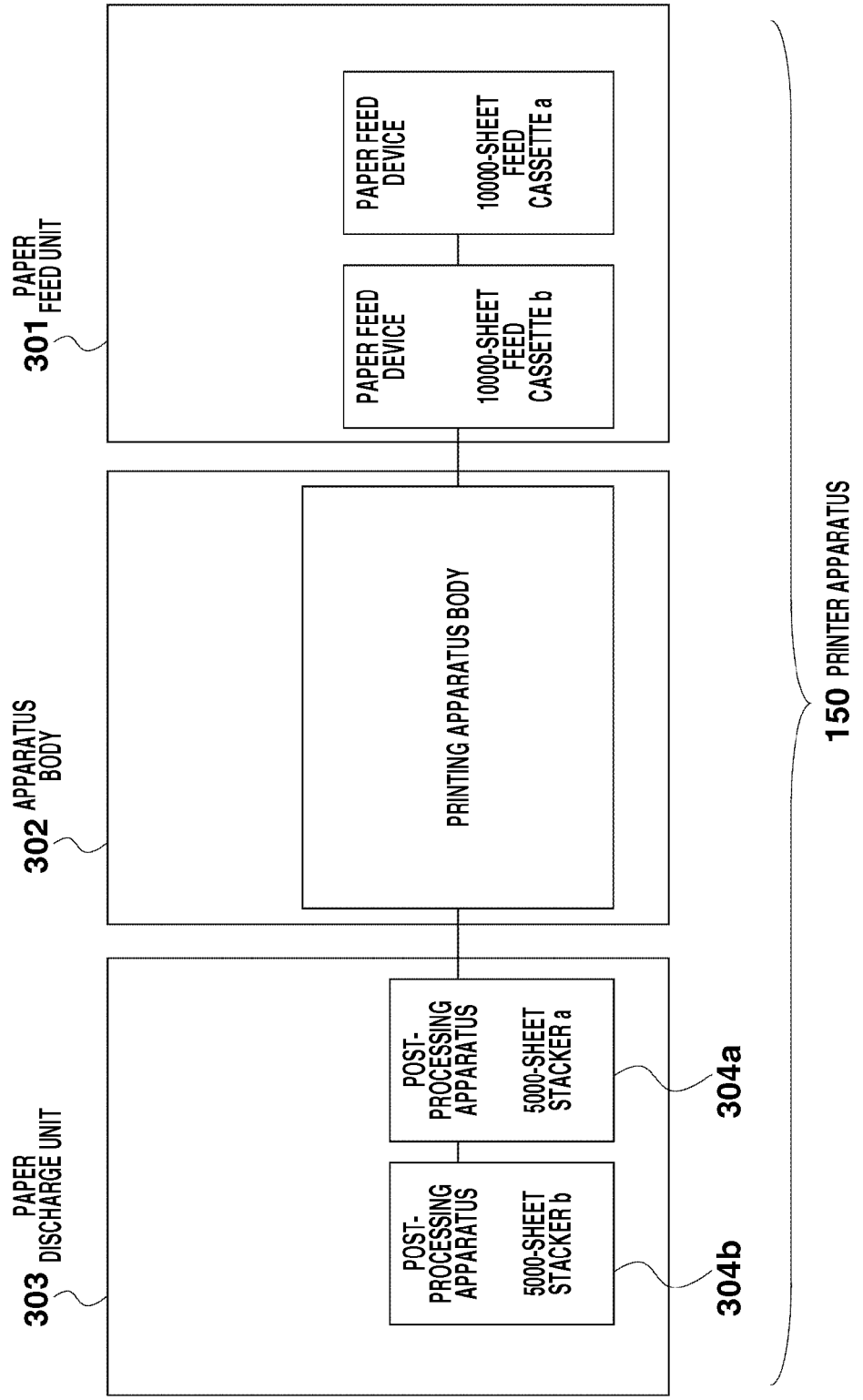
FIG. 3 illustrates an exemplary configuration of a printer apparatus.

FIG. 3 illustrates an example of a configuration of the printer apparatus 150 according to the present exemplary embodiment, which includes the paper feed unit 301, an apparatus body 302, and the paper discharge unit 303. Referring to FIG. 3, the paper feed unit 301 feeds a sheet used in printing. The apparatus body 302 generates an image and prints the generated image on the fed sheet. The paper discharge unit 303 stacks printed sheets in the unit of a designated number of copies.

As described above with reference to FIG. 1, the apparatus body 302 acquires print data transmitted from the printer driver 202 via the bidirectional interface 130. Furthermore, the received print data is printed on a sheet fed from the paper discharge unit 303 within the apparatus body 302. The printed sheet is output by the apparatus body 302.

Now, the printer apparatus 150, which includes a plurality of paper feed stages and has a function for stacking a large number of sheets to be printed and printed sheets, will be described in detail below with reference to FIG. 3.

The printer apparatus includes the external memory (HDD) 111. The external memory 111 stores image data of a part of the entire copies and a print setting set for the entire copies. The printer apparatus feeds an appropriate paper sheet from the paper feed unit 301 according to the print data stored on the external memory 111.

Furthermore, the apparatus body 302 prints the image data. The sheet having the image data printed thereon is stacked by the paper discharge unit 303 in the unit of a copy. The above-described operation is executed for the number of times equivalent to the number of copies designated by the printer driver.

Each of stacker apparatuses 304a and 304b is connected to the paper discharge unit 303. A maximum number of stackable sheets is set to each of the stacker apparatuses 304a and 304b. If it is determined that the number of sheets to be stacked exceeds the maximum number of stackable sheets, then the apparatus body 302 executes control for displaying a message, which prompts the user to remove the output sheet that has already been stacked thereon, on the operation panel 159 of the printer apparatus 150. Then, the printing is suspended. After it is determined that the discharged sheet has been removed, then the printing is resumed and continued.

Referring to FIG. 3, the printer apparatus 150 includes a plurality of stacker apparatuses (the stacker apparatuses 304a and 304b), which is connected to the apparatus body 302 as the paper discharge unit 303, and has the following configuration.

More specifically, if the stacker 304a is in a fully stacked state, the apparatus body 302 automatically changes the output destination stacker apparatus from the stacker 304a to the stacker 304b. Accordingly, the apparatus body 302 can continue the printing operation without suspending it.

Now, an example of a user interface of the printer driver 202, which is provided in the printing system according to the present exemplary embodiment, will be described in detail below with reference to FIG. 4 and FIGS. 6A and 6B.

Figure 4:
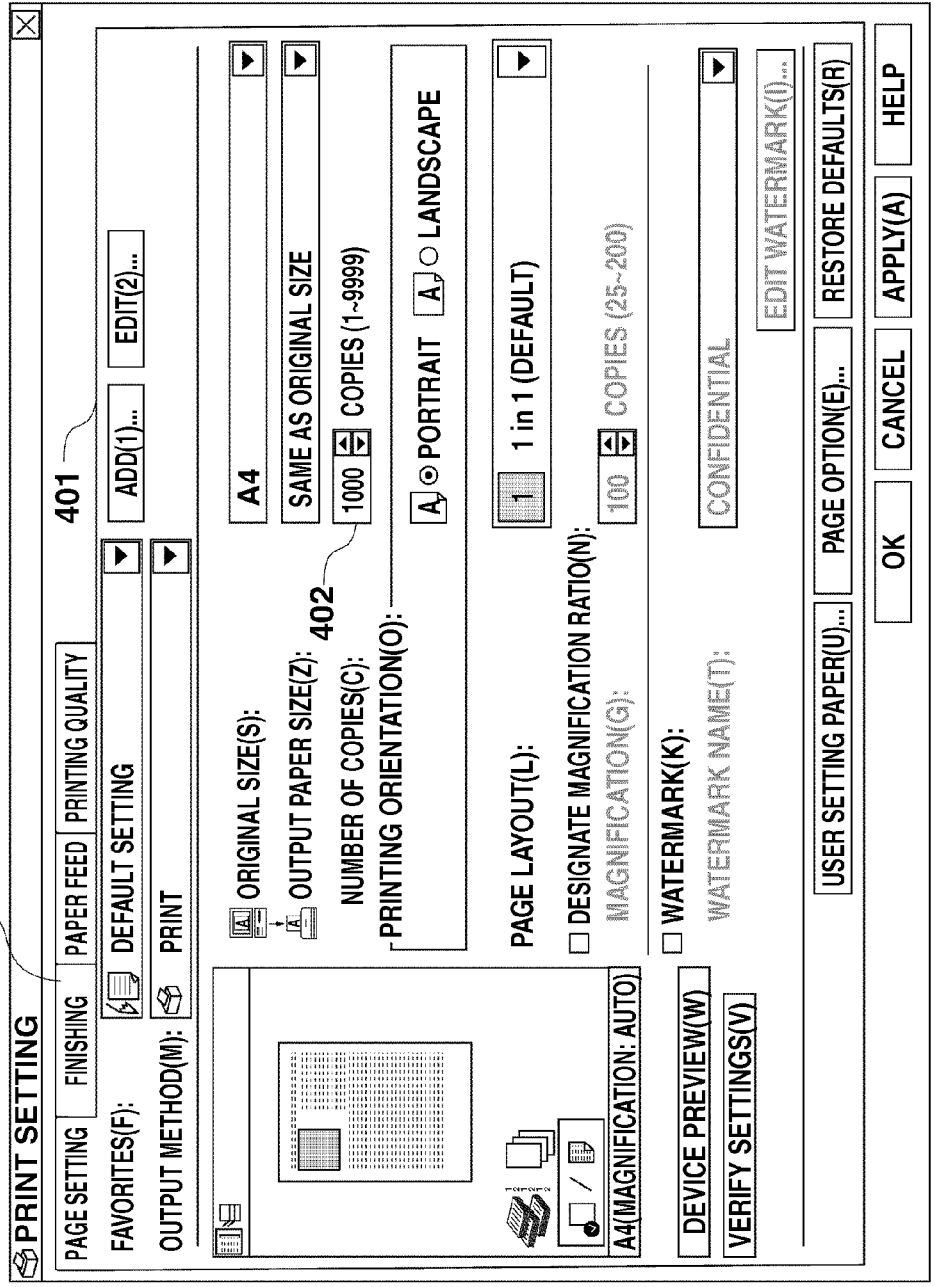
FIG. 4 illustrates an example of a page setting sheet included in a printer driver.

FIG. 4 illustrates an example of a screen displayed immediately after a "page setting" tab is selected via a print setting dialog of the printer driver 202. The print setting dialog can be opened by calling a printer folder, which is managed by the OS, or a user interface module (the UI 202-1 (FIG. 2)) of the printer driver. The image generation application 200 calls the user interface module of the printer driver.

Exemplary screens illustrated in FIGS. 4, 5, 6, and 11 are displayed on the CRT 110 under control of the UI 202-1. The printer driver generates a setting to be set thereby based on a value input via the screen. The printer driver transmits the generated setting to the printer apparatus 150 together with print data. The printer apparatus 150 prints the received print data according to the setting transmitted from the information processing apparatus 100.

In the example illustrated in FIG. 4, the screen includes a page setting sheet 401. The user can designate a parameter of the print setting related to the page setting via the user interface of the page setting sheet. More specifically, the user execute a setting of the desired number of copies 402 as well as executing a setting of the original size, the output paper size, the orientation of printing (portrait or landscape), a page layout, and a magnification.

FIG. 5A illustrates an example of a screen displayed when a "finishing setting" tab 403 is selected via the print setting dialog of the printer driver 202. Referring to FIG. 5A, the screen includes a finishing sheet 501. The user can designate a print setting parameter for the finishing of a print job via the user interface included in the finishing sheet 501.

More specifically, the user can execute designation of a printing method 502, a binding direction 503, a paper discharge method 504, a paper discharge destination 505, and a check box 506 for selecting a designated number of copies. For the printing method 502, the user can select and set one-sided printing or two-sided printing and bookbinding printing.

For the binding direction 503, the user can designate a binding location on the sheet. The printer driver can automatically designate the printing orientation for printing the front or the back side of the printing sheet according to the binding location designated by the user. At the same time as the user sets the binding direction 503, the printer driver automatically sets the location for setting the binding margin.

For the paper discharge method 504, the user can select from among alternatives, such as "not selected", "sort", "group", "staple and sort", and "staple and group". If the user has selected "sort", the printer driver outputs the resulting print product in the unit of a copy. On the other hand, if the user has selected "group", the print product can be discharged in the unit of a page.

For the paper discharge destination 505, the user can select a paper discharge unit included in the printer apparatus 150. In the present exemplary embodiment, the printer apparatus 150 includes a plurality of stacker apparatuses (the stacker apparatuses 304a and 304b). Accordingly, the user can select "stacker (auto)", "stacker-a", or "stacker-b".

If the user has selected "stacker (auto)" and given an instruction for starting printing, the apparatus body 302 outputs the resulting printed sheet on the stacker-a if the output on the stacker-a is available. On the other hand, if the number of sheets to be output exceeds the maximum number of stackable sheets of the stacker-a, the apparatus body 302 automatically changes the paper discharge destination to the stacker-b.

If output on the stacker-a is not available, the apparatus body 302 outputs the printed sheet on the stacker-b. If the user has designated the stacker-a or the stacker-b and given an instruction for starting printing, then the apparatus body 302 outputs the printed sheet within the maximum number of stackable sheets of the designated stacker (the stacker-a or the stacker-b).

If the maximum number of stackable sheets of the designated stacker is to be exceeded, the operation panel 159 displays a message that prompts the user to remove the already discharged sheet from the designated stacker. After it is determined that a sufficient number of discharged sheets have been removed from the designated stacker, the apparatus body 302 resumes the output of the print job. The printer apparatus 150 repeats the above-described operation until the printing of the designated number of copies is completed.

The user can select a function for stacking printed sheets by the designated number of copies by checking the check box 506 for selecting a designated number of copies. A designated number of copies setting range 508, which is used in relation to a designated number of copies field 507, indicates the setting range of the designated number of copies 507. A value of the designated number of copies 507 can be variably set according to the maximum number of stackable sheets of the designated stacker and the setting of the number of copies for the print job. Control of the designated number of copies setting range 508 will be described in detail below.

In the example illustrated in FIG. 5A, the same value as set in the setting of the desired number of copies field 402 is set for the designated number of copies 507 as an initial value. This is intended to prevent a case from occurring such that if the user has set the stacking by the number of copies by checking the check box 506 for selecting a designated number of copies by mistake, and if a value "1" is set to the designated number of copies 507 as an initial value, then the apparatus body 302 may change the stacker, display a message that prompts the user to remove the discharged sheets, and issues a notification of the end of the stacking by the designated number of copies every time one copy is output.

FIG. 6A illustrates an example of a screen that indicates the status of installation of optional apparatuses used in the printing controlled by the printer driver 202 and connected to the printer apparatus 150, such as the stacker apparatus. The screen illustrated in FIG. 6A is displayed when the user selects a printer icon, which is displayed in the printer folder managed by an OS 205.

Referring to FIG. 6A, when the user presses a configuration information acquisition button 602, which is provided on a device setting sheet 601 of the printer driver 202, a status acquisition request is transmitted to the status acquisition unit 204.

Then, the status acquisition unit 204 notifies a request for configuration information to the printer apparatus 150. The status acquisition unit 204 acquires the configuration information about the printer apparatus 150 including information about the connected optional apparatus from the printer apparatus 150.

In the present exemplary embodiment, the configuration information about the printer apparatus 150, which is connected when the printer driver 202 is installed, is automatically acquired. The configuration information includes information about a function of the paper discharge unit 303 and the paper feed unit 301.

More specifically, the configuration information about the printer apparatus 150 includes the maximum number of stackable sheets of the stacker apparatuses 304a and 304b, the maximum number of sheets that can be included in the paper feed unit 301, and the method of connection of the stacker apparatuses 304a and 304b and the paper feed unit 301 to the printer apparatus 150.

FIG. 6B illustrates an example of configuration information acquired from the printer apparatus 150. Referring to FIG. 6B, the configuration information includes a model name 620, finisher information 621, stacker information 622 and 623, and paper deck information 624. In the model name 620, it is described that a print on demand (POD) printer is currently connected. In the finisher information 621, it is described that no finisher is currently connected. In addition, in the stacker information 622 and 623, it is described that two stackers that can stack 5,000 sheets, respectively, are connected. Furthermore, in the paper deck information 624, it is described that a paper feed unit (a POD deck) capable of stacking 10,000 sheets is connected.

Figure 7A:
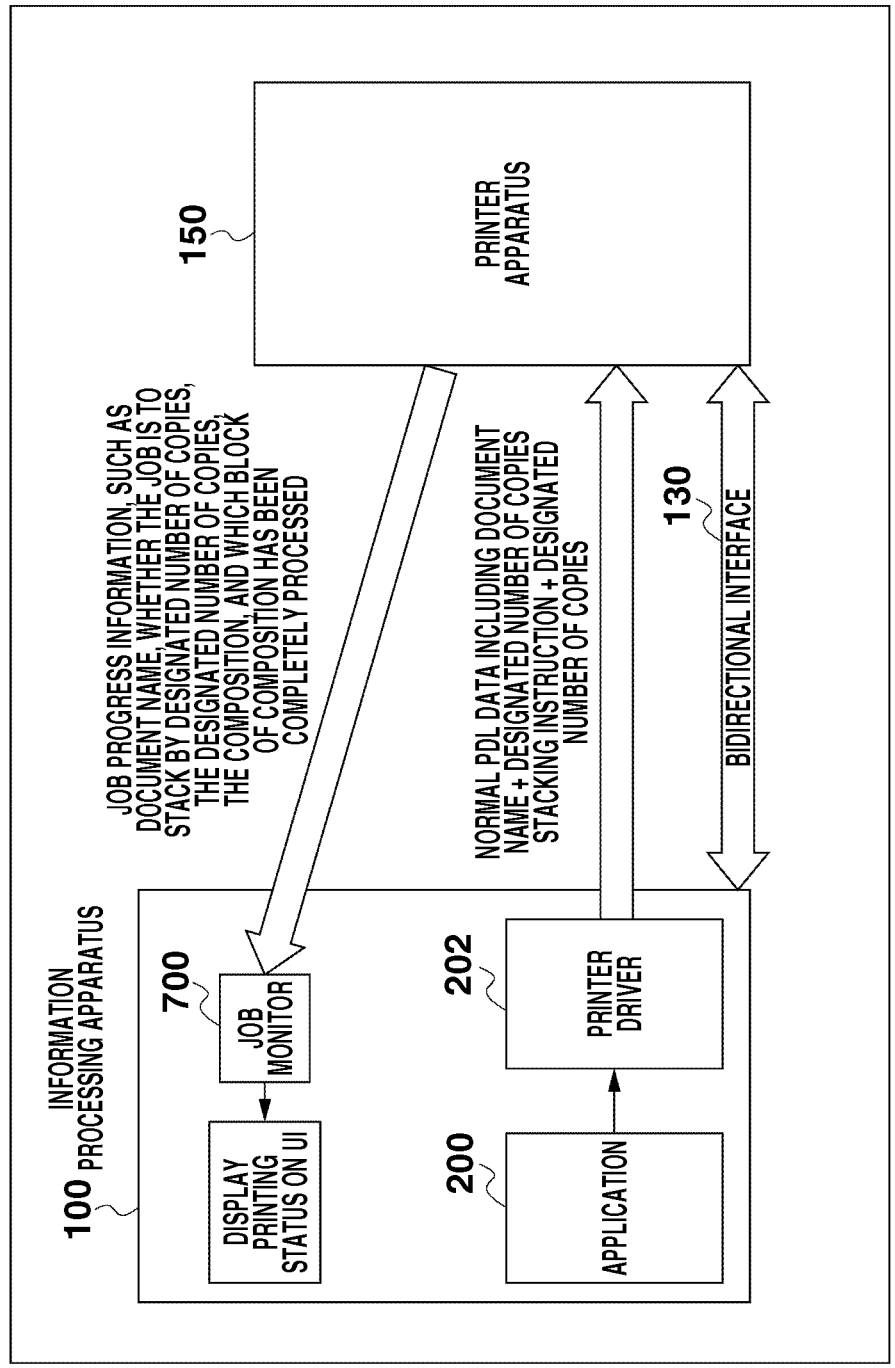
FIGS. 7A and 7B illustrate an exemplary configuration of a job monitor.

FIG. 7A illustrates an example of a configuration of a job monitor, which monitors the operation status of the printer apparatus 150. Referring to FIG. 7A, when a job monitor 700 is activated by the user or the application during processing of a print job, the monitoring of the operation status of the printer apparatus 150 starts.

More specifically, if a job for stacking printed sheets by the designated number of copies is executed, the printer driver 202 transmits information describing whether the job is a job for stacking the printed sheets in the unit of a copy to the printer apparatus 150 together with PDL data to be printed including the name of the document to be printed. In addition, if the job is a job for stacking printed sheets by the designated number of copies, the printer driver 202 transmits the designated number of copies to the printer apparatus 150 together with the PDL data.

After receiving the above-described information from the printer driver 202, the printer apparatus 150 notifies the job monitor 700 (FIG. 7) of the document name, whether the job is a job for stacking by the designated number of copies, the number of divisions for stacking, and to which part of the stacking job the divided stacking has been already completed. After receiving the above-described information from the printer apparatus 150, the information processing apparatus 100 can present a message (FIG. 7B) to the user, which indicates that the stacking by the designated number of copies has been completed.

Figure 7B:
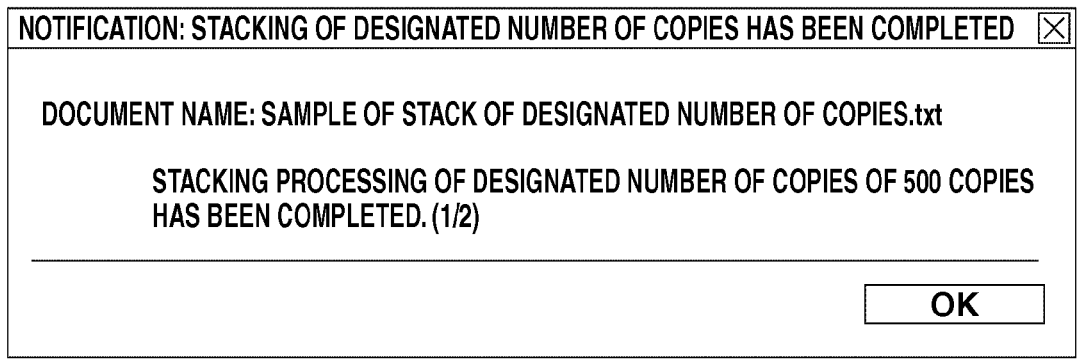

In the example illustrated in FIG. 7B, it is described that stacking by 500 copies has been executed for a job for processing a document named "sample of stack of designated number of copies.txt". Furthermore, in the example illustrated in FIG. 7B, "1/2" indicates that the number of divisions for stacking is "2". The number "1" in "1/2" indicates that the stacking of a first divided half has been completed.

More specifically, in the present exemplary embodiment, the resulting printed products are stacked in two stack groups including 500 copies each when the printing is completed. Before a job is completed and every time one stack group including the designated number of printed copies (including 500 copies in the present exemplary embodiment) is completed, a notification of completion of stacking is issued.

The stacking completion notification is distinguished from a notification of completion of printing of the entire job. To paraphrase this, the stacking completion notification is intended merely to notify that the stacking by the designated number of copies has been completed.

More specifically, it is useful if the notification of completion of stacking by the designated number of copies is issued to a user A and a user B (the users A and B are different from the user who has input the job) serially and if the notification of completion of printing of the entire job is notified to the system administrator, the user who has input the job, and another specific user C.

Figure 5B:
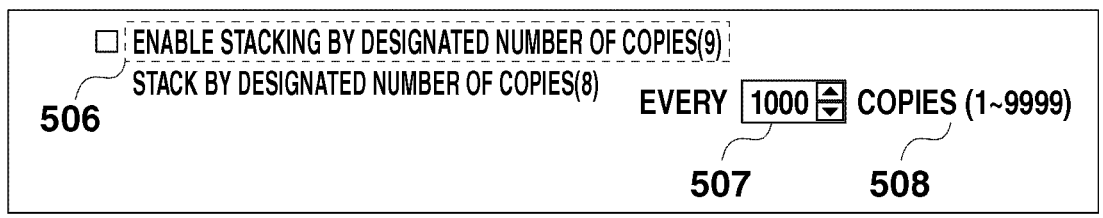

After displaying the above-described message to the user, the user takes out the printed bundle including the stack of the designated number of copies, which has been designated by setting the designated number of copies 507 (FIG. 5B). Then, the user can proceed to a next operation. A predetermined user can take out the printed bundle every time the printing of the printed bundle is completed.

Now, control for determining the designated number of copies setting range 508 for the above-described stacking by the designated number of copies will be described in detail below. A minimum value thereof is fixedly defined at "1".

In addition, a setting value of the setting of the desired number of copies 402 for the entire print job is acquired and stored. Furthermore, the maximum number of stackable sheets, which has been set in the paper discharge destination 505, is stored.

It is useful if the user sets the value of the paper discharge destination 505 by hand. However, the present invention is not limited to this. More specifically, it is also useful if the UI 202-1 automatically sets information acquired by the printer driver 202 based on the device information about the stacker apparatus as the value of the paper discharge destination 505.

If the alternative "stacker (auto)" has been selected, then the maximum number of stackable sheets that is the smallest of the maximum numbers of stackable sheets of the stackers whose configuration information has been acquired is stored.

The UI 202-1 compares the stored maximum number of stackable sheets and the setting of the desired number of copies 402. The UI 202-1 sets the smaller of the stored maximum number of stackable sheets and the setting of the desired number of copies 402 as the maximum number of stackable sheets of the stacking by the designated number of copies.

It is also useful if the maximum number of stackable sheets for the stacking by the designated number of copies is calculated in the above-described manner. More specifically, the maximum number of stackable copies is calculated by dividing the maximum number of stackable sheets by the number of pages of the print data included in the print job. In this case, the UI 202-1 compares the maximum number of stackable copies with the value set in the setting of the desired number of copies 402. Then, the smaller of the maximum number of stackable copies and the setting of the desired number of copies 402 is set as the maximum setting value of the stacking by the designated number of copies.

If the maximum number of stackable copies obtained by dividing the maximum number of stackable sheets by the number of pages of the print data constituting the job is smaller than the value set to the setting of the number of copies 402, the maximum setting value may be set after an alarm display is displayed.

However, in most cases, the number of pages included in one copy may not be recognized by a normal printer driver 202 until the printing is started. Accordingly, in the present exemplary embodiment, it is supposed that the maximum number of stackable sheets is equivalent to the maximum number of stackable copies with respect to print data of one page (one copy includes one page), which is included in the entire print job.

It is also useful if the printer driver 202 includes a mode for determining the number of pages before starting printing. More specifically, in this case, the printer driver 202 can correctly calculate the maximum number of stackable copies based on the number of pages acquired from the image generation application 200.

In addition, in this case, the accuracy of calculating the maximum number of stackable copies can be improved by calculating the maximum number of stackable copies based on a minimum number of included sheets included in one copy, such as a setting of a front cover, aback cover, an insertion sheet, and 2-in-1 printing, which is calculated by the printer driver 202.

Now, a flow of control described above with reference to FIGS. 1 through 4, FIGS. 5A and 5B, FIGS. 6A and 6B, and FIGS. 7A and 7B will be described in detail below with reference to flowcharts illustrated in FIGS. 8 through 10 and an exemplary notification illustrated in FIG. 11.

Now, processing for acquiring information about the printer apparatus 150 will be described in detail below with reference to FIG. 8. Processing in the flow chart illustrated in FIG. 8 is started when the OS is activated.

Referring to FIG. 8, in step S801, the status acquisition unit 204 determines whether the printer driver 202 is to be initially installed. If it is determined that the printer driver 202 is not to be initially installed (that the printer driver 202 has already been installed) (NO in step S801), then the processing advances to step S802. On the other hand, if it is determined that the printer driver 202 is to be initially installed (YES in step S801), then the processing advances to step S803.

In step S802, the status acquisition unit 204 determines whether the device information acquisition button 602 has been pressed in the device setting sheet 601 via the screen illustrated in FIG. 6A. If it is determined that the device information acquisition button 602 has been pressed in the device setting sheet (YES in step S802), then the processing advances to step S803. On the other hand, if it is determined that the device information acquisition button 602 has not been pressed in the device setting sheet (NO in step S802), then the processing returns to step S801.

In step S803, the status acquisition unit 204 gives a request for configuration information to the printer apparatus 150 connected to the printer driver 202. Then, the processing advances to step S804.

In step S804, the status acquisition unit 204 determines whether a predetermined length of time has elapsed from the timing of giving the request. If it is determined that the predetermined length of time has elapsed (YES in step S804), then the processing advances to step S805. On the other hand, if it is determined that the predetermined length of time has not elapsed (NO in step S804), then the processing advances to step S806.

In step S806, the status acquisition unit 204 determines whether the configuration information has been acquired. More specifically, in step S806, the status acquisition unit 204 determines whether the printer apparatus 150 has notified the printer driver 202 of the status of connection of optional apparatuses in response to the above-described request for configuration information.

If it is determined that the configuration information has been acquired (YES in step S806), then the processing advances to step S807. On the other hand, if it is determined that the configuration information has not been acquired yet (NO in step S806), then, the processing returns to step S804.

In step S805, the status acquisition unit 204 executes control for displaying a message indicating that the configuration information has not been acquired on the UI 202-1. In step S808, the processing for acquiring the configuration information ends.

In step S807, the status acquisition unit 204 stores the acquired configuration information in the printer driver 202. In addition, in step S807, the status acquisition unit 204 displays the content of the acquired configuration information on the UI of the device setting sheet 601. Then the processing ends.

FIG. 6B illustrates an example of the configuration information acquired in the above-described manner in the present exemplary embodiment. FIG. 6A illustrates an example of a screen displaying the content of the acquired configuration information.

In the present exemplary embodiment, it is supposed that two stacker apparatuses X1 have been determined. In addition, it is supposed that the maximum number of stackable sheets of each of the stacker apparatuses is 5,000 sheets. Furthermore, in the present exemplary embodiment, it is supposed that a multifunction peripheral (MFP) whose model type is "POD PRINTER" has been detected. In addition, it is supposed that a paper feed unit named "POD DECK" capable of stacking 10,000 sheets has been detected.

Now, a flow of control of the UI for stacking by the designated number of copies, which is executed when the printer driver 202 is activated from the application 200 and the finishing sheet 501 is selected in executing the print setting, will be described in detail below with reference to FIG. 9. The processing illustrated in the flow chart of FIG. 9 is executed by the UI 202-1 unless otherwise described.

Figure 9B:
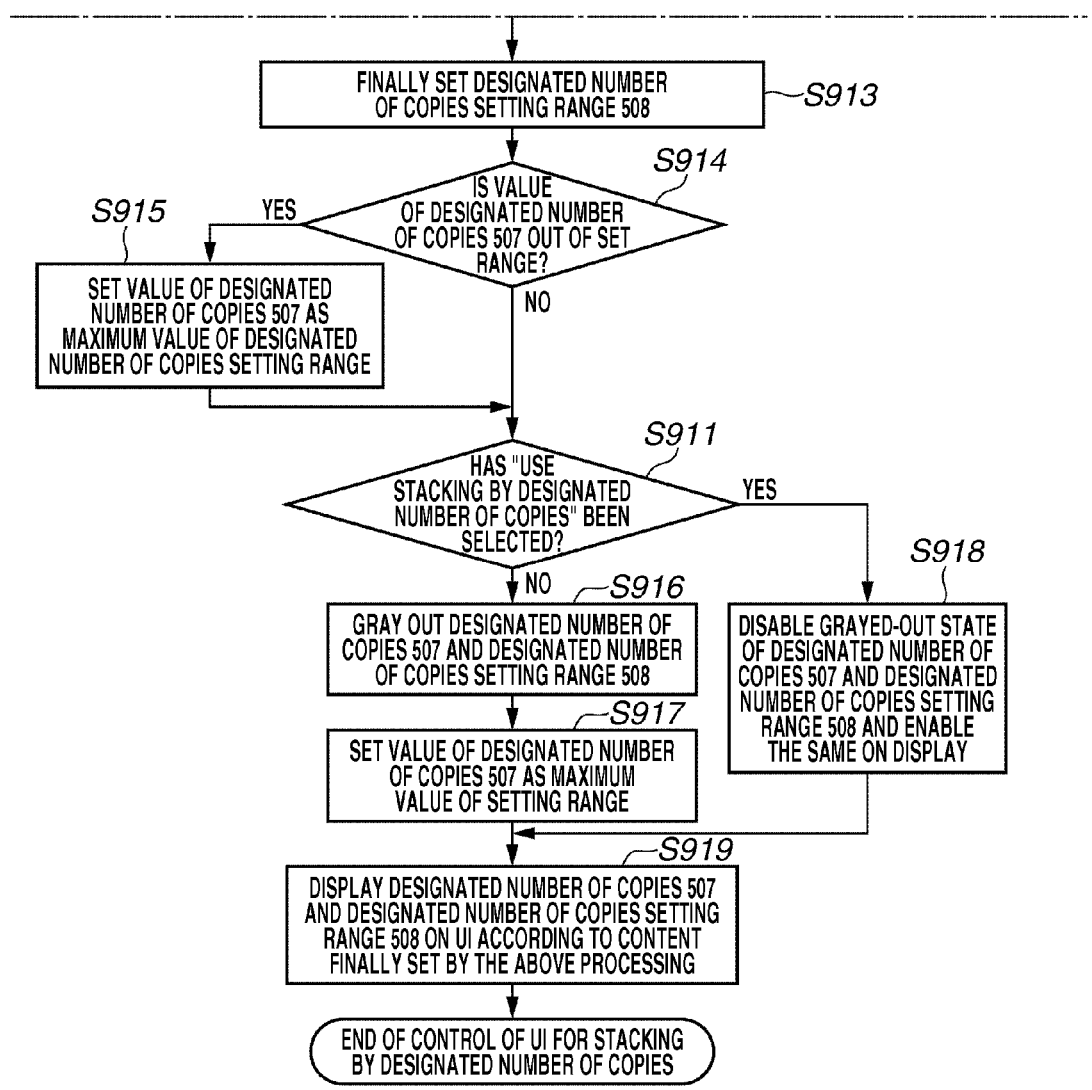
FIG. 9, composed of FIGS. 9A and 9B, is a flow chart illustrating an exemplary flow of control of a user interface (UI) screen for setting stacking by a designated number of copies, which is included in a printer driver.

Referring to FIG. 9, in step S901, the UI 202-1 determines whether the finishing sheet 501 has been selected. If it is determined that the finishing sheet 501 has been selected (YES in step S901), then the processing advances to step S902.

In step S902, the UI 202-1 starts the calculation of the designated number of copies setting range 508 for the stacking by the designated number of copies. More specifically, in step S902, the UI 202-1 sets a value "1" to the minimum setting value. Then, the processing advances to step S903.

In step S903, the UI 202-1 stores the value of the setting of the number of copies 402 of the page setting sheet 401. In the present exemplary embodiment, it is supposed that the user has set a value "1,000" (copies) as the value of the setting of the desired number of copies 402.

In step S904, the UI 202-1 determines whether the maximum number of stackable sheets of the stacker apparatus set as the paper discharge destination 505 has been acquired by executing the configuration information acquisition processing described above with reference to FIG. 8. If it is determined that the maximum number of stackable sheets of the stacker apparatus has not been acquired yet (NO in step S904), then the processing advances to step S920 to set the setting value of the number of copies of the entire print job as the maximum setting value.

In step S905, the UI 202-1 determines whether "stacker (auto)" has been selected in the paper discharge destination 505 (FIG. 5A). If it is determined that "stacker (auto)" has been selected in the paper discharge destination 505 (YES in step S905), then the processing advances to step S907. In step S907, the UI 202-1 stores the maximum number of stackable sheets that is the smallest of the maximum numbers of stackable sheets of the plurality of stackers connected to the printer apparatus 150 as the maximum number of stackable sheets. In the present exemplary embodiment, the maximum number of stackable sheets of each of the stacker-a and the stacker-b is 5,000 sheets. Accordingly, the UI 202-1 sets the value "5,000" for the maximum number of stackable sheets.

On the other hand, if it is determined that "stacker (auto)" has not been selected in the paper discharge destination 505 (NO in step S905), then the processing advances to step S906. In step S906, the UI 202-1 determines which of the alternatives has been set for the paper discharge destination 505 (FIG. 5A). In steps S908 and S909, the UI 202-1 sets the maximum number of stackable sheets of the stacker that has been set as the paper discharge destination (the stacker-a or the stacker-b).

More specifically, in the present exemplary embodiment, in steps S908 and S909, i.e., if either one of the stacker-a and the stacker-b has been selected for the paper discharge destination 505, the UI 202-1 sets the value "5,000" as the maximum number of stackable sheets because the maximum number of stackable sheets of each of the stacker-a and the stacker-b is 5,000.

In step S910, the UI 202-1 calculates the minimum number of sheets included in one copy. Then the processing advances to step S912.

In step S912, the UI 202-1 sets the smaller of the setting of the desired number of copies 402 and the maximum number of stackable copies, which has been calculated in step S910, as the maximum value of the designated number of copies setting range 508. Then, the processing advances to step S913.

More specifically, supposing that the minimum number of sheets included in one copy is "1" and if the maximum number of stackable copies is calculated under this condition, the maximum number of stackable copies is 5,000 copies regardless of which alternatives of the paper discharge destination 505 the user sets. In the present exemplary embodiment, it is supposed that the user has selected "stacker (auto)".

In the present exemplary embodiment, the minimum number of sheets included in one copy is "1" because the number of pages cannot be identified until the print data is transmitted to the printer driver 202. However, if a mode for determining the number of pages before starting printing is provided or if the number of pages is acquired from the image generation application 200 before starting printing, the maximum number of stackable copies can be correctly calculated.

Furthermore, the accuracy of calculating the maximum number of stackable copies can be improved by calculating the same based on the minimum number of sheets included in one copy according to the setting for a front cover, a back cover, and an insertion sheet, which is calculated by the printer driver 202.

In the manner as described above, in step S912, the UI 202-1 compares the set number of designated copies (=1,000 copies) and the maximum number of stackable copies of the stacker (=5,000 copies) and sets the smaller of the two values (i.e., the value "1,000" (copies)) as the maximum setting value of the stacking by the designated number of copies. To paraphrase this, the numerical value "1,000" is set to the designated number of copies 507 (FIG. 5B) and is displayed on the screen.

In step S913, after the calculation of the designated number of copies setting range 508 for the stacking by the designated number of copies is completed, the designated number of copies setting range 508 for the designated number of copies 507, which is displayed on the finishing sheet 501, is determined.

In step S914, the UI 202-1 determines whether the value set to the designated number of copies setting range 508 is out of the setting range calculated for determining the value of the designated number of copies 507. If it is determined that the set value is out of the setting range (YES in step S914), then the processing advances to step S915. In step S915, the UI 202-1 changes the value to the maximum setting value. Then, the processing advances to step S911.

On the other hand, if it is determined that the set value is within the setting range (NO in step S914), the UI 202-1 stores the value set to the designated number of copies 507 as it is. Then, the processing advances to step S911.

In step S911, the UI 202-1 determines whether the check box 506 for selecting a designated number of copies has been checked. If it is determined that the check box 506 for selecting a designated number of copies has not been checked (NO in step S911), then the processing advances to step S916. In step S916, the UI 202-1 disables the designated number of copies 507 and the designated number of copies setting range 508 by displaying the same in a gray-out state.

In step S917, the UI 202-1 sets the value set to the designated number of copies 507 as the maximum value of the designated number of copies setting range 508. This is intended to prevent a case from occurring where stacking by the number of copies that is not desired by the user is executed if the designation for executing the stacking by the designated number of copies only has been executed but the setting of the designated number of copies has not been executed.

In the present exemplary embodiment, the initial value is set as the maximum value of the designated number of copies setting range 508 if the stacking by the designated number of copies has not been designated. However, the present invention is not limited to this. More specifically, it is also useful if the above-described processing is executed only when the value "1" is set as the value of the designated number of copies. In addition, it is also useful if a value other than the maximum value is used as the initial value.

If it is determined that the check box 506 for selecting a designated number of copies has been checked (YES in step S911), then the processing advances to step S918. In step S918, the UI 202-1 disables the gray-out state of the designated number of copies 507 and the designated number of copies setting range 508 and enables the setting of the designated number of copies 507. It is also useful if the maximum setting value of the designated number of copies setting range 508 is set as the initial value of the designated number of copies 507, as described above.

In step S919, the UI 202-1 executes a display of the designated number of copies 507 and the designated number of copies setting range 508 on the UI according to the content determined by executing the above-described control.

If a value "1" is set to the setting of the desired number of copies 402, a value "1-1" is set to the designated number of copies setting range 508. Accordingly, in this case, it is also useful if the UI 202-1 sets a value "1" to the designated number of copies 507 and displays the designated number of copies 507 in a grayed out state.

The flow of control described above with reference to FIG. 9 starts when the finishing sheet 501 is displayed for the first time for the print job or when the printing conditions, such as the setting of the desired number of copies 402, the paper discharge destination 505, and information about the maximum number of stackable sheets of the stacker have changed. Accordingly, it is not necessary to calculate the above-described values again if the above-described printing conditions have not been changed after the last calculation thereof. The stacking by the designated number of copies is started by executing printing of the print job after setting the above-described setting.

As described above with reference to FIGS. 7A and 7B, the printer driver 202 transmits a command if the printer apparatus 150 supports stacking by the designated number of copies, which is characteristic to the present exemplary embodiment, and the printer apparatus 150 transmits the above-described information to the job monitor 700 in response to the command.

The function for executing stacking by the designated number of copies according to the present exemplary embodiment is useful on any printer apparatus capable of serially outputting sheets by the designated number of copies even when the printer apparatus 150 does not support the function for executing stacking by the designated number of copies.

Now, processing executed when the printer apparatus 150 supports the function for executing stacking by the designated number of copies or when the printer apparatus 150 does not support the function for executing stacking by the designated number of copies will be described in detail below with reference to the flow chart of FIG. 10. By executing the above-described processing for acquiring the configuration information, the printer driver 202 can acquire information about the type of the printer apparatus 150 and information about whether the printer apparatus 150 supports the function for executing stacking by the designated number of copies.

Figure 10:
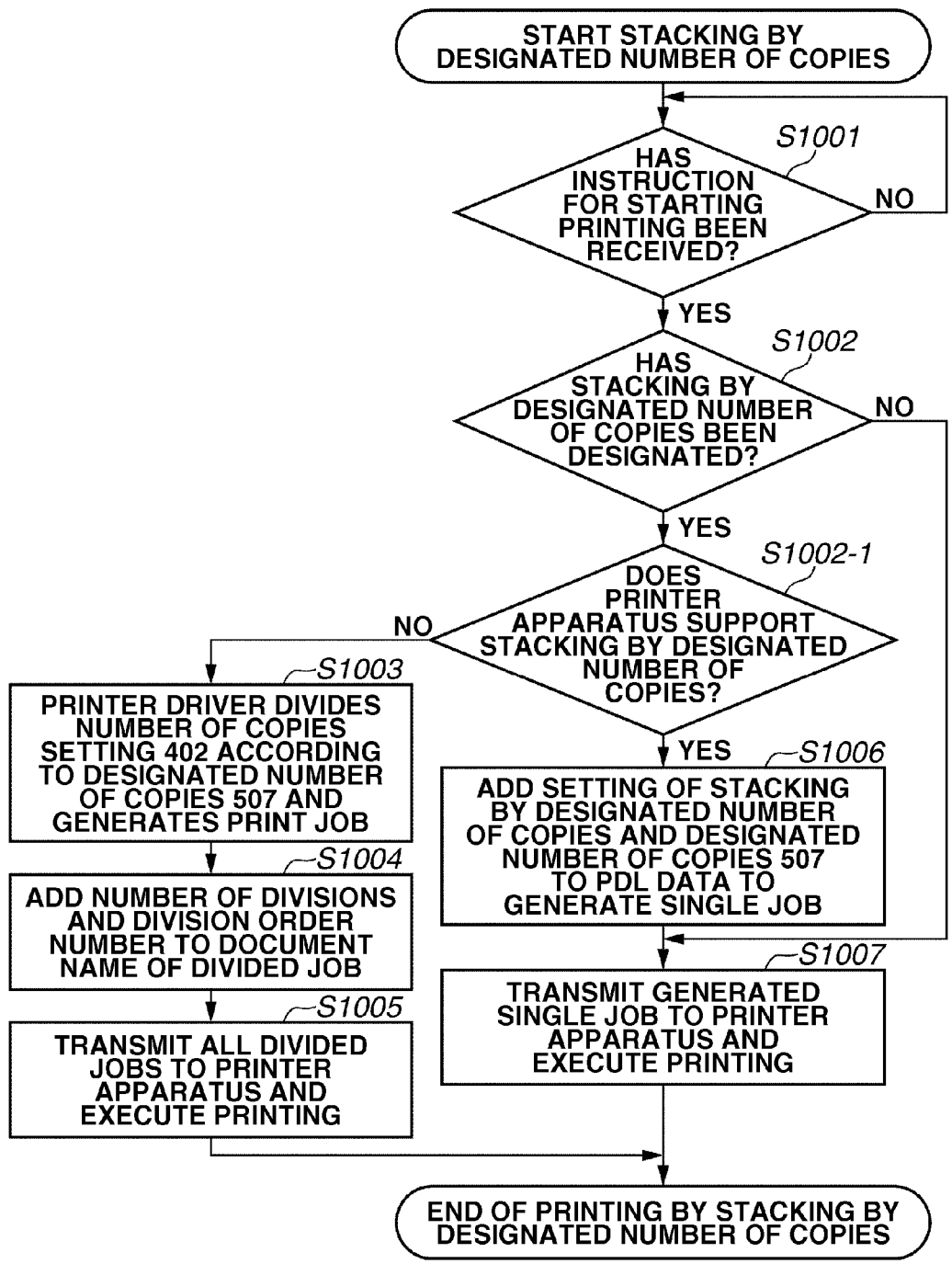
FIG. 10 is a flow chart illustrating an example of processing for controlling a printer driver when printing using stacking by a designated number of copies is currently executed.
Figure 11:
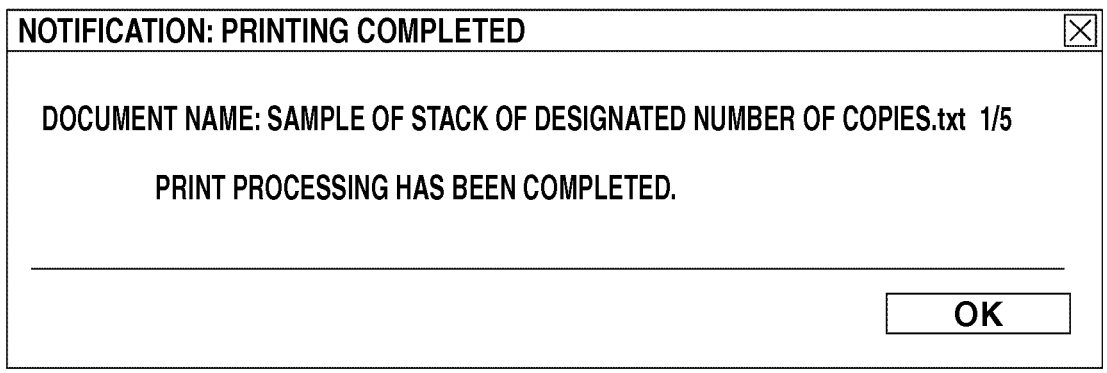
FIG. 11 illustrates an example of a job monitor UI of a printer apparatus that does not support stacking by a designated number of copies.

Referring to FIG. 10, in step S1001, it is determined whether an instruction for starting printing of the print job has been input. If it is determined that the start of the printing of the print job has been instructed (YES in step S1001), then the processing advances to step S1002. In step S1002, the printer driver 202 determines whether the printer apparatus 150 supports the function for executing stacking by the designated number of copies.

If it is determined that the printer apparatus 150 does not support the function for executing stacking by the designated number of copies (NO in step S1001), then the processing returns to step S1001 and waits until an instruction for starting printing of a print job is input.

On the other hand, if it is determined that the printer apparatus 150 supports the function for executing stacking by the designated number of copies (YES in step S1002), then the processing advances to step S1002-1. In step S1002-1, the printer driver 202 determines whether the printer apparatus 150, which has been designated as a printing apparatus that executes the printing of the input print job, supports the function for executing stacking by the designated number of copies.

If it is determined that the printer apparatus 150, which has been designated as a printing apparatus that executes the printing of the input print job, does not support the function for executing stacking by the designated number of copies (NO in step S1002-1), then the processing advances to step S1003. In step S1003, the printer driver 202 divides the setting of the desired number of copies 402 by the number equivalent to the value set to the designated number of copies 507 to generate a job in the number equivalent to the number of divisions calculated in this manner.

In step S1004, the printer driver 202 adds the number of divisions and information for identifying the order of the divided job to the document name included in the divided job. In step S1005, the printer driver 202 executes the printing of all the divided jobs. For example, the printer driver 202 adds "1/5" (division information) to the document name or the job name. The number "5" in the division information "1/5" indicates the number of divisions while the number "1" of the division information indicates that the order of the corresponding job is "1" (i.e., that the divided job is the first to be executed).

As described above, the printer driver 202 according to the present exemplary embodiment adds the division information to the document name and prints the print job. Accordingly, the user is enabled to execute printing by the designated number of copies by merely verifying the document name.

More specifically, if a print job in which the division information "3/5" is included in the document name is currently printed, then the user can recognize that the third divided job, among the total of five divided jobs, is currently processed. To paraphrase this, the user can understand that it is likely that the first and the second divided jobs, among the five divided jobs, have already been completely printed but the third divided job is currently processed.

After the printing of each divided job is completed, the printer apparatus 150 notifies job completion information to the job monitor 700 together with the document name as described above. FIG. 11 illustrates an example of a message displayed by the job monitor 700. In the present exemplary embodiment, the user is enabled to recognize which one of the plurality of divided jobs, which are processed by stacking by the designated number of copies, has been completely processed by referring to the message displayed by the job monitor 700.

Returning to FIG. 10, if it is determined that the printer apparatus 150 that has been set as the printing apparatus used for the print job supports the function for executing stacking by the designated number of copies (YES in step S1002-1), then the processing advances to step S1006. In step S1006, the printer driver 202 enables the function for executing stacking by the designated number of copies for the print job and generates a single print job to which the designated number of copies is added. In step S1007, the printer driver 202 transmits the generated job to the printer apparatus 150 to execute printing of the job. An example of the job transmitted in step S1007 will be described in detail below with reference to FIG. 12.

The printer apparatus 150 divides the designated number of copies by the number of entire copies to be printed. In addition, the printer apparatus 150 issues a completion notification indicating that the number of copies "1" has been completely processed to the job monitor 700 every time the printing of the designated number of copies is completed. Furthermore, the printer apparatus 150 changes the stacker for discharging the printed sheets thereon according to the setting set to the paper discharge destination 505 and continues the printing.

Then, after the processing of the entire print job is completed, the printer apparatus 150 issues a single job completion notification to the job monitor 700. Then the processing ends.

FIG. 12 illustrates an example of the job transmitted in step S1007 (FIG. 10). Referring to FIG. 12, the job includes a job header 1211, a binder header 1210, a document 1208, and PDL data 1209, which are hierarchically provided. One job includes one defined binder. One binder includes one defined document.

The PDL 1209 includes print commands. The document defined by the document header 1208 includes print settings, such as a paper size, a paper type, a printing orientation, and a resolution, and PDL data.

The binder header 1210 can include a designated number of copies 1203, a paper discharge destination 1204, and a stacking by the designated number of copies 1205. In addition, the job includes a job name 1201 and a billing code 1202, which is to be used in charging the fee for the printing.

When a single job is executed, the printer apparatus interprets the content of the PDL data 1209 according to the print setting 1212, which is set to the document included in the job. Furthermore, the printer apparatus prints the job on the sheets in the number of copies designated in a number of copies command 1203.

If a value "500" has been designated in the command of a stacking by the designated number of copies 1205, the print products are stacked by every 500 copies. The value designated in the designated number of copies 507 (FIG. 5B) is set in the command 1205 while the value set to the setting of the desired number of copies 402 (FIG. 4) is set in the command 1203. The printer apparatus 150 outputs the print products on the paper discharge destination designated in the command 1204.

According to the present exemplary embodiment, in executing printing of a print job from an information processing apparatus, a function is implemented for dividing the print job into a number of divided print jobs whose number is equivalent to the number of copies designated by the user and stacking resulting print products by the designated number of copies. Accordingly, the user is enabled to produce a bundle including print products of the designated number of copies and take out the same from the stacker.

Furthermore, if a plurality of stacker apparatuses is provided, the present exemplary embodiment, when print products of the designated number of copies are completely output on one stacker apparatus, outputs print products on another stacker apparatus. Accordingly, the present exemplary embodiment can enable the user to produce a bundle of print products of the desired designated number of copies without suspending the printing of the print job.

In addition, as described above, the present exemplary embodiment calculates the setting range of the designated number of copies based on the total number of copies of the entire print job and the maximum number of stackable sheets of the stacker and variably displays the same on the UI, which is controlled by the printer driver. Accordingly, the present exemplary embodiment can enable the user to correctly set the number of copies.

Furthermore, in the present exemplary embodiment, the printer driver determines whether the printer apparatus supports the function for executing stacking by the designated number of copies. Moreover, if it is determined that the printer apparatus supports the function for executing stacking by the designated number of copies, the present exemplary embodiment executes the printing of the print job as one entire job. On the other hand, if it is determined that the printer apparatus does not support the function for executing stacking by the designated number of copies, the present exemplary embodiment divides the print job by the number equivalent to the designated number of copies. Accordingly, the present exemplary embodiment can implement printing by the designated number of copies every time the user executes printing in an environment in which the output of print products by the designated number of copies is available.

In the present exemplary embodiment, the information processing apparatus 100 is used as the information processing apparatus according to the present exemplary embodiment. In addition, in the present exemplary embodiment, the information processing apparatus 100 includes, as the user interface of the printer driver, the designated number of copies 507 for designating the number of copies to be stacked in the unit of stacking the print media.

In addition, in the present exemplary embodiment, the user sets attributes of the input print job based on the designated number of copies. Furthermore, the input attributes are transmitted to the image forming apparatus (the printer apparatus 150) via the PRTC or a network card.

In the present exemplary embodiment, the printer apparatus 150 is used as an example of the image forming apparatus. However, the present invention is not limited to this. More specifically, it is also useful if an MFP including a scanner function or a facsimile transmission function is used as the image forming apparatus. In addition, it is also useful if an upper limit value that can be set as the number of copies to be stacked as a unit is the same as the value of the number of copies of the entire print job.

Moreover, it is also useful if the printer driver determines whether to set the upper limit value that can be set as the number of stackable copies, which is an example of information about the number of copies, at the same value as the value of the number of copies of the entire print job or at the same value as the maximum number of stackable copies that can be stacked by the post-processing apparatus.

Furthermore, it is also useful if the smaller of the number of copies of the entire print job and the maximum number of stackable copies of the post-processing apparatus is set as the upper limit value for the setting.

In addition, it is also useful if the following configuration is employed. More specifically, if the user has designated, by checking the check box 506 for selecting a designated number of copies (FIG. 5B), stacking the print products by a predetermined number of copies as one unit, then the user interface executes control for acquiring information indicating that the printing of the designated number of copies has been completed every time the printing of the designated number of copies is completed. In this case, the user interface displays the information indicating that the printing of the designated number of copies has been completed on the CRT 110.

It is also useful if the following configuration is employed. More specifically, the printer driver determines whether the printer apparatus 150, which is an example of the image forming apparatus according to the present exemplary embodiment, supports the function for executing stacking by the designated number of copies. If it is determined that the printer apparatus 150 supports the function for executing stacking by the designated number of copies, then the printer driver gives an instruction to the image forming apparatus for outputting the print products by the designated number of copies.

More specifically, it is also useful if the printer driver determines whether the printer apparatus 150 supports the function for executing stacking by the designated number of copies. If it is determined that the printer apparatus 150 does not support the function for executing stacking by the designated number of copies, then printer driver divides the print job into a plurality of jobs by a number equivalent to the designated number of copies and transmits the divided print jobs according to the designated number of copies.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-129200 filed May 28, 2009, which is hereby incorporated by reference herein in its entirety.

What is claimed is:

1. An information processing apparatus operable to transmit a print job comprising:
    a display control unit configured to display a user interface to designate first number-of-copies information indicating a number of copies to be printed and second number-of-copies information indicating a number of copies;
    a designation unit configured to designate the second number-of-copies information wherein the second number-of-copies information is used for issuing a notification indicating that a part of the number of copies is output;
    a first transmission unit configured to set an attribute of the print job based on the first and second number-of-copies information designated by the designation unit and to transmit the print job including the attribute to an image forming apparatus;
    wherein the notification is issued each time the part of the number of the copies is output and before the print job is completed; and
    a second transmission unit configured to determine whether the image forming apparatus supports a function for executing stacking by a designated number of copies and if it is determined that the image forming apparatus does not support the function for executing stacking by the designated number of copies, configured to divide the print job into a plurality of divided print jobs by a number equivalent to the designated number of copies indicated by the second number-of-copies information and to transmit the divided print jobs to the image forming apparatus.

2. The information processing apparatus according to claim 1, wherein an upper limit value that can be set as the number-of-copies information is set to a same value as a number of copies of the print job.

3. The information processing apparatus according to claim 1, further comprising a display unit configured, if it is designated via the user interface to stack a predetermined number of printed copies in a lump as a unit, to receive and display information indicating that printing is completed every time printing of the number of copies indicated by the second number-of-copies information is completed.

4. The information processing apparatus according to claim 1, further comprising a second transmission unit configured to determine whether the image forming apparatus supports a function for executing stacking by a designated number of copies indicated by the second number-of-copies information and if it is determined that the image forming apparatus supports the function for executing stacking by the designated number of copies, configured to transmit an instruction to the image forming apparatus for outputting print products by the designated number of copies indicated by the second number-of-copies information designated by using a printer driver.

5. A method for controlling an information processing apparatus operable to transmit a print job, the method comprising:
    displaying a user interface to designate first number-of-copies information indicating a number of copies to be printed and second number-of-copies information indicating a part of the number of copies;
    designating the second number-of-copies information;
    using the second number-of-copies information for issuing a notification indicating that a part of the number of copies is output;
    setting an attribute of the print job based on the designated first and second number-of-copies information; and
    transmitting the print job including the set attribute to an image forming apparatus;
    wherein the notification is issued each time the part of the number of copies is output and before the print job is complete;
    determining whether the image forming apparatus supports a function for executing stacking by a designated number of copies;
    dividing, if it is determined that the image forming apparatus does not support the function for executing stacking by the designated number of copies, the print job into a plurality of divided print jobs by a number equivalent to the designated number of copies indicated by the second number-of-copies information; and
    transmitting the divided print jobs to the image forming apparatus.

6. The method according to claim 5, wherein an upper limit value that can be set as the number-of-copies information is set to a same value as a number of copies of the print job.

7. The method according to claim 5, further comprising receiving and displaying, if it is designated via the user interface to stack a predetermined number of copies of printed material in a lump as a unit, information indicating that printing is completed every time printing of the number of copies indicated by the second number-of-copies information is completed.

8. The method according to claim 5, further comprising:
    determining whether the image forming apparatus supports a function for executing stacking by a designated number of copies; and
    transmitting, if it is determined that the image forming apparatus supports the function for executing stacking by the designated number of copies indicated by the second number-of-copies information, an instruction to the image forming apparatus for outputting print products by the designated number of copies indicated by the second number-of-copies information designated by using a printer driver.

9. A non-transitory computer-readable storage medium storing instructions which, when executed by a computer, cause the computer to perform the method according to claim 5.

10. A non-transitory computer-readable storage medium storing instructions to execute a method for transmitting a print job to an image forming apparatus, the method comprising:

displaying a user interface to acquire first number-of-copies information indicating a number of copies to be printed and second number-of-copies information indicating a part of the number of copies;

using the second number-of-copies information for issuing a notification indicating a part of the number of copies is output;

setting an attribute of the print job based on the first and second number-of-copies information;

transmitting the print job including the attribute to the image forming apparatus, wherein the notification is issued each time the part of the number of copies is output and before the print job is complete;

determining whether the image forming apparatus supports a function for executing stacking by a designated number of copies;

dividing, if it is determined that the image forming apparatus does not support the function for executing stacking by the designated number of copies, the print job into a plurality of divided print jobs by a number equivalent to the designated number of copies indicated by the second number-of-copies information; and transmitting the divided print jobs to the image forming apparatus.

* * * * *